Feb. 6, 1923.
R. LANDENBERGER.
PROPORTION FINDER.
FILED JUNE 11, 1921.
1,444,381.
2 SHEETS—SHEET 1.
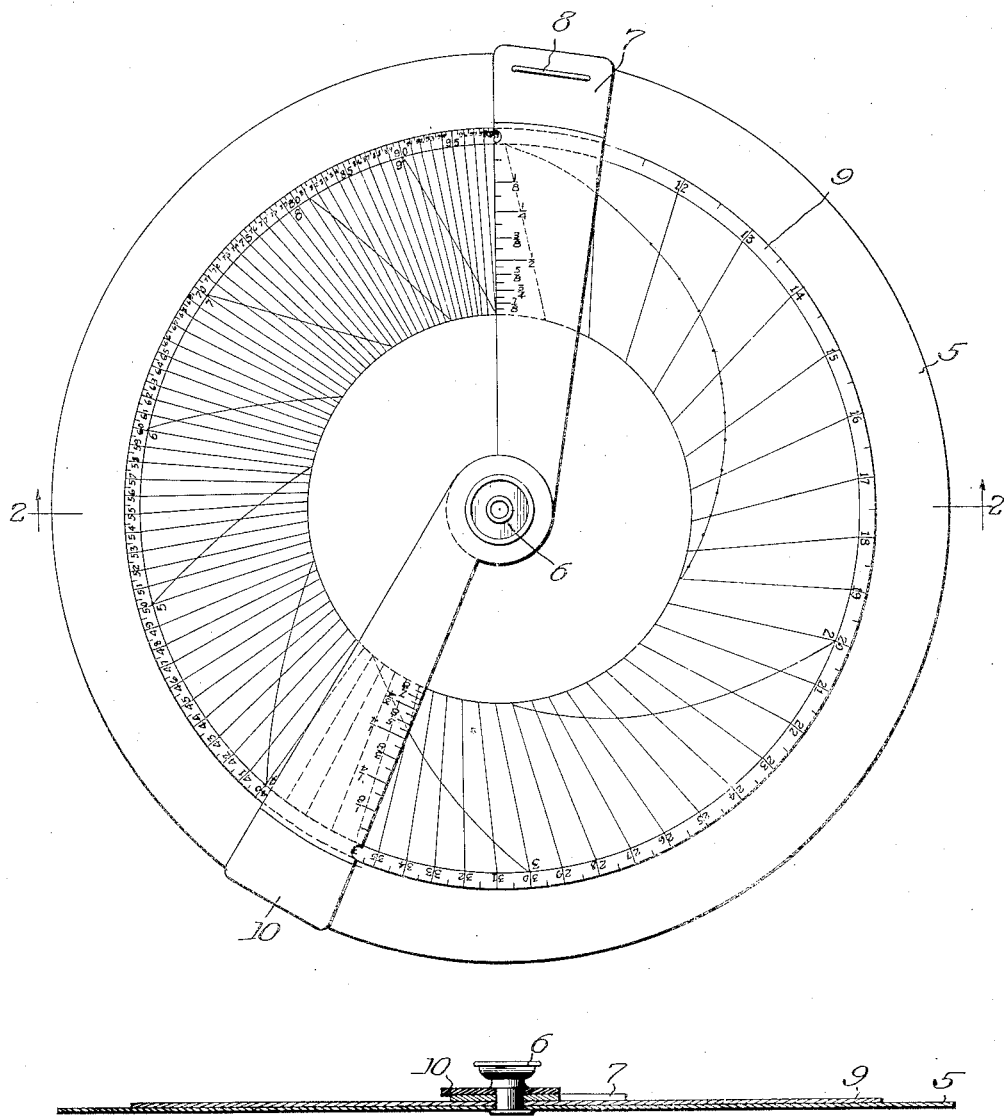
Witness:
Fred C. Davison
Inventor
Ralph Landenberger
By Wilkinson, Huxley, Byron & Knight
Attys.

Feb. 6, 1923.

R. LANDENBERGER.
PROPORTION FINDER.
FILED JUNE 11, 1921.

Witness:
Fed. C. Davison

Inventor:
Ralph Landenberger
By Wilkinson, Huxley, Byron & Knight
Attys.

Patented Feb. 6, 1923.

1,444,381

UNITED STATES PATENT OFFICE.

RALPH LANDENBERGER, OF CHICAGO, ILLINOIS.

PROPORTION FINDER.

Application filed June 11, 1921. Serial No. 476,743.

*To all whom it may concern:*

Be it known that I, RALPH LANDENBERGER, a citizen of the United States, residing at Chicago, in the county of Cook and State of Illinois, have invented certain new and useful Improvements in Proportion Finders, of which the following is a specification.

This invention relates to a new and improved calculating device, and more particularly to a device of this character especially adapted for use as a proportion finder in determining the relative proportions of a cut or drawing when reduced from a larger drawing or other copy.

The dealer in paper, the printer or lithographer, and others dealing with the making of cuts or drawings, often find it necessary to calculate the relative proportions to determine the size which a drawing or other copy must be made in order to provide a cut of the proper dimensions when reduced. It is sometimes necessary to determine the equivalent proportions when a smaller drawing or other design is enlarged from a smaller size.

I have shown in a prior Patent, No. 997,680, issued July 11, 1911, a calculating device, which among other things is adapted to determine these proportions. However, that device is provided with scales divided into tenths of an inch, whereas the majority of measurements made in connection with such work are expressed in sixteenths of an inch or similar greater fractions. Such fractions, running as they do to three or four decimal places, are extremely difficult to read upon a device divided into decimals. Further, my prior device was provided with a scale reading from 10 to 100, which made no provision for the direct reading of digits. My prior device further used two related scales, but I have found that for many purposes it is more desirable to provide a plurality of indices and a single scale.

It is an object of the present invention to provide a new and improved calculating device which is particularly adapted for use in proportional calculations, and it is a further object to provide a device of that character which is adapted to read all figures from 1 to 100 and to read fractional interpolations throughout its scale with facility.

It is an additional object to provide a device which is composed of but few parts and is simple in design and construction and in operation.

Other and further objects will appear as the description proceeds.

Broadly, my invention comprises a supporting member, a fixed index associated with the supporting member, a scale member carried by the supporting member and movable relative thereto, and a movable index movable relative to both scale and supporting member. The scale member is so graduated as to read from one to one hundred and to be readily read in fractions. Preferably the fractions are read as vulgar fractions down to sixteenths.

I have illustrated two preferred embodiments of my invention in the accompanying drawings, in which—

Figure 1 is a plan view of one form of the invention;

Figure 2 is a section on line 2—2 of Figure 1;

Figure 3:
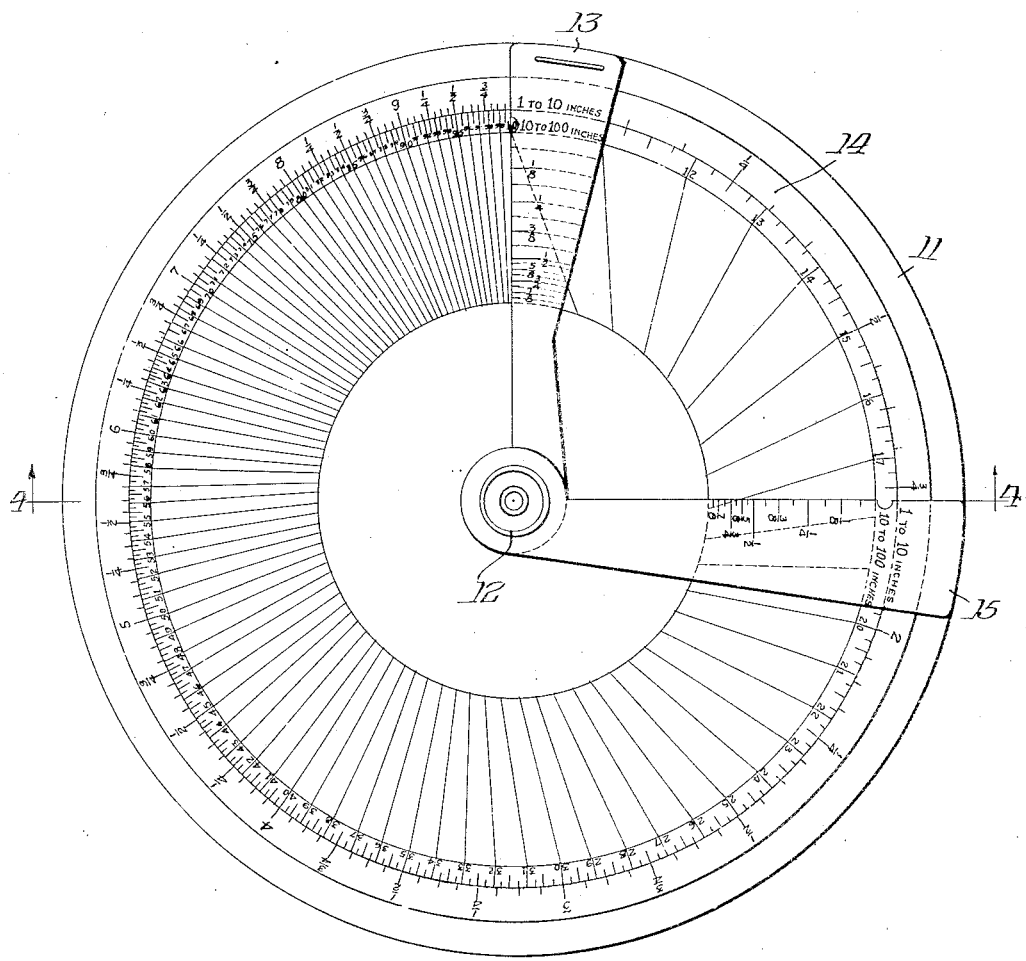
Figure 3 is a plan view of a modified form.

Referring first to Figures 1 and 2, the supporting member 5 is provided with the centrally located pivot 6. The fixed index 7 is secured to the pivot 6 and its outer end is secured to the supporting member 5 by the staple 8. The scale carrying member 9 is rotatably supported on the pivot 6. A second index 10 is secured to the pivot 6 and is freely rotatable thereon.

The perimeter of the scale carrying member 9 is provided with a logarithmic scale reading from 10 to 100. A series of diagonal lines leads inwardly, one from each of the full graduations on the scale, the lines being so directed that when reaching an inner circle they intersect at that circle, the radius connecting the center of the scale-carrying member and the next higher number. The two indices are provided with graduations expressed in sixteenths of an inch, these graduations being so spaced as to cooperate with the diagonal lines just referred to.

A second series of inwardly extending lines is drawn, each line extending over ten graduations on the scale; that is, for example, the line drawn from 10 upon the periphery of the scale member intersects the inner circle upon the radius intersecting 20 upon the periphery. These lines, where extending between the lower numbers, are curved as shown in Figure 1; and where extending to the high numbers, the curve approaches a straight line. This second series of inwardly extending lines is also so drawn as to coact with the scales upon the two indices. The first-mentioned series of inwardly extending lines, when coacting with the scales upon the indices, indicates the relative position of the indices in sixteenths as between adjacent figures, as 10 and 11, for example. The second series of inwardly extending lines coacts with the scales upon the indices to indicate the relative position of the indices, as between numbers spaced by tenths upon the outer scale, as for example, 10 and 20. In other words, then, this first series of lines may be used in computations where the numbers involved are between 10 and 100. The second series of lines may be used where the computations involve digits; that is, for use in connection with the second series of lines, 10 may be read as 1, 20 as 2, etc.

Figure 4:
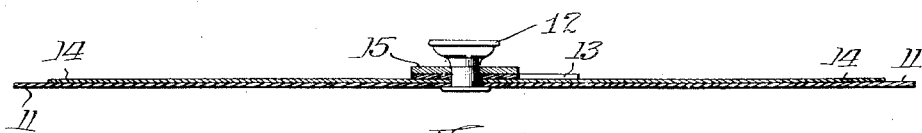
Figure 4 is a section on line 4—4 of Figure 3.

Referring now to Figures 3 and 4, the modified form of the device consists of the supporting member 11, pivot 12, fixed index 13, scale carrying member 14, and movable index 15. The fixed index shown in this figure has both of its edges extending upon radial lines where they extend over the scale bearing portion of the scale member. Thus either edge of the scale may be used for reading purposes. This facilitates the use of the device where the two numbers involved are very close together, so that if only one edge were usable it might be that the other number involved was covered by the index.

The scales upon the indices are the same as those shown upon Figure 1. The scale carrying member is provided with a scale divided the same as that upon the form of Figure 1, the scale, however, being provided only with the first series of inwardly extending lines shown in the form of Figure 1. The member is further provided with a second scale located outwardly of the main scale. The main scale comprises numbers from 10 to 100, the secondary outer scale is divided from 1 to 10, and is subdivided into sixteenths. It will be understood, of course, that both scales are logarithmic and hence 1 will be opposite 10, 2 opposite 20, etc. However, the outer scale being divided into vulgar fractions, these subdivisions will not be opposite the decimal divisions of the inner scale.

In the use of the first form of the device, when reading between 1 and 10, fractions will be read by reading the intersections of the second series of inwardly extending lines, with the graduations upon the indices. If desired to distinguish these lines from the other series of inwardly extending lines, they may be printed in red or some other color. Further to aid in reading, if desired, the lines may be dotted, as shown in the line extending from 10 to 20, these dots being located at the sixteenth points on the line. Obviously various other expedients for aiding in reading may be adopted, if desired.

With the second form of the device, the reading of fractions between 1 and 10 is accomplished simply by reading the intersection of the outer scale with the reading edge of the index. If desired, this outer scale and the words "One to ten inches" on the indices may be printed in a color different from that of the main scale and of the remainder of the lettering on the indices.

In both forms of the device computations between numbers running from 10 to 100 are read by the intersections of the main series of inwardly extending lines with the reading edges of the indices, this reading being in sixteenths. If desired, instead of forming the indices in the manner of index 13 on Figure 3, to facilitate reading of closely spaced numbers the indices may be made of transparent celluloid or other similar material.

To illustrate the method of using the proportion finder, let us assume that a drawing measures $21\frac{1}{4}$ inches by $28\frac{5}{16}$ inches. It is desired to determine the size of a half-tone or other cut, if the $21\frac{1}{4}$ inch width is reduced to $4\frac{1}{4}$ inches. Referring to the form of the device shown in Figures 1 and 2, first line up $21\frac{1}{4}$ with the fixed index; that is, so rotate the scale carrying member that the line extending inwardly from 21 upon the scale intersects the index scale at the point marked $\frac{1}{4}$. moving the movable index similarly until it registers $28\frac{5}{16}$. Now turn the scale member until the line of the second series extending from 4 intersects the fixed index at $\frac{1}{4}$.

Referring to the other index, we find that the line of the second series reading from 5 intersects the index scale at $\frac{11}{16}$. The drawing will therefore reduce to a cut $4\frac{1}{4}$ inches by $5\frac{11}{16}$. This example, due to the fractions involved, is extremely difficult of solution by any other method of calculating. Yet on this form of the instrument it is as simple as finding any proportionate size.

In the same example, on the form of the device shown in Figure 3, the movements will be the same, the reading of the reduced sizes being read upon the second or outer scale at the point of intersection of that scale with the reading edge of the indices.

It will be readily apparent that the device may be used for a large number of calculations involving the same or similar requirements as are involved in the finding of proportions.

I claim:

1. In a calculating device, a supporting member, a fixed index associated with said supporting member, a scale member carried by the supporting member and movable relative thereto, and a movable index member movable relative to the scale and supporting members, the scale member being provided with two superposed sets of lines leading from the graduations upon its scales, one set leading from scale graduations indicating digits and the second set from graduations indicating higher numbers, said lines coacting with scales upon the indices whereby said indices may be selectively used for coacting with either set of lines for the setting or reading of amounts interpolated between the scale graduations.

2. In a calculating device, a supporting member, a fixed index associated with said supporting member, a scale member carried by the supporting member and movable relative thereto, and a movable index member movable relative to the scale and supporting members, the scale member being provided with two superposed sets of lines leading from the graduations upon its scales, one set leading from scale graduations indicating digits and the second set from graduations indicating higher numbers, said lines coacting with scales upon the indices whereby said indices may be selectively used for coacting with either set of lines for the setting or reading of amounts interpolated between the scale graduations, the scales upon the indices being expressed in vulgar fractions.

3. In a calculating device, a supporting member, a pivot therein, a scale disk adapted to be rotated about said pivot, a fixed index having one end attached to said pivot and the outer end attached to the supporting member beyond the edge of the disk, a movable index rotatable about the pivot, both said indices having radial reading edges, the scale disk being provided with two sets of scale markings one for digits and fractions thereof and the other for higher numbers, the indices both being adapted to coact with both said scales, the indices being provided with scales divided in vulgar fractions adapted to coact with the scales upon the scale member for determining interpolated settings and readings.

Signed at Chicago, Illinois, this 9th day of June, 1921.

RALPH LANDENBERGER.